(No Model.) 4 Sheets—Sheet 1.

C. B. DAVIS.
APPARATUS FOR HERMETICALLY SEALING CANS.

No. 345,488. Patented July 13, 1886.

Witnesses. Inventor.
Sam'l B. Dover. Chuyler B. Davis
Wm. J. Hurall by E. B. Stocking
 Attorney (No Model.) 4 Sheets—Sheet 2.

C. B. DAVIS.
APPARATUS FOR HERMETICALLY SEALING CANS.

No. 345,488. Patented July 13, 1886.

Witnesses
Sam'l B Dover.
Henry Frankfurter.

Inventor.
Chuyler B Davis,
by E B Stocking
Att'y (No Model.) 4 Sheets—Sheet 3.

C. B. DAVIS.
APPARATUS FOR HERMETICALLY SEALING CANS.

No. 345,488. Patented July 13, 1886.

Witnesses
Sam'l B. Dover.
W. S. Duvall

Inventor
Chuyler B. Davis,
by E. B. Stocking Atty.

(No Model.) 4 Sheets—Sheet 4.
C. B. DAVIS.
APPARATUS FOR HERMETICALLY SEALING CANS.
No. 345,488. Patented July 13, 1886.
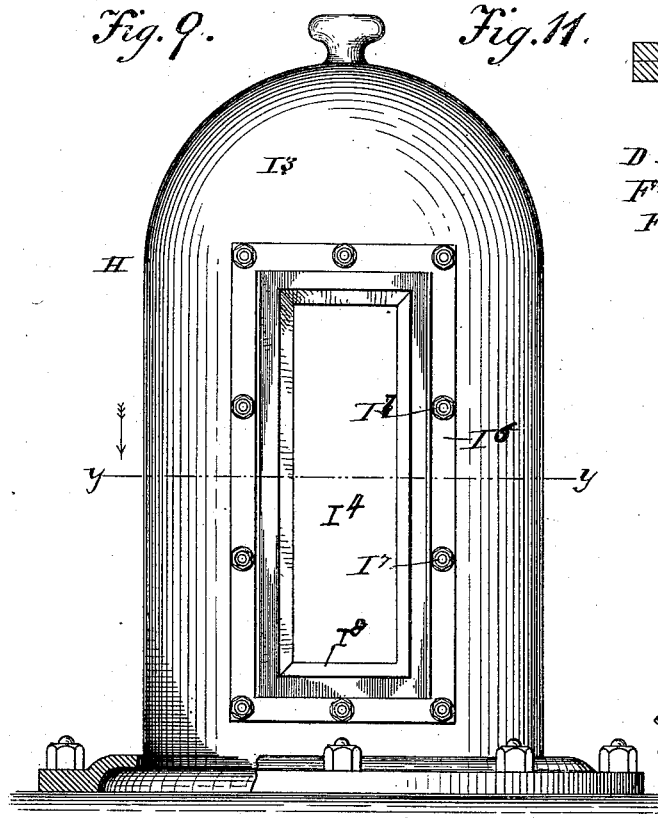
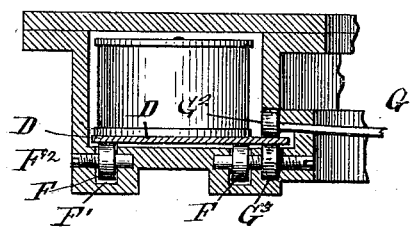
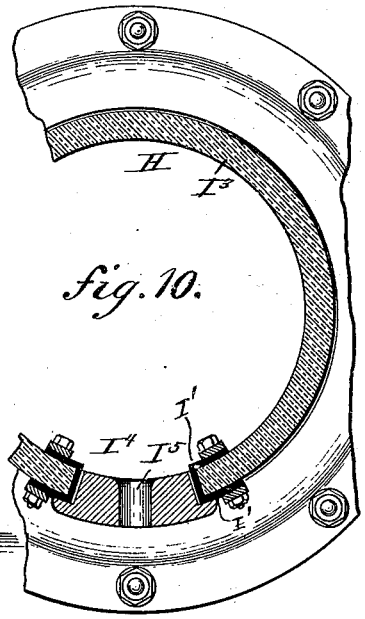
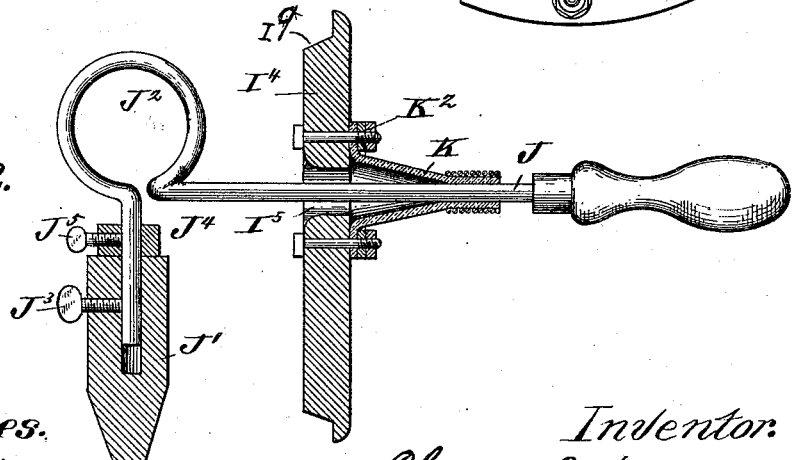
Witnesses. Inventor:
Chuyler B. Davis
by E B Stocking
Atty

UNITED STATES PATENT OFFICE.

CHYLER B. DAVIS, OF CHICAGO, ILLINOIS.

APPARATUS FOR HERMETICALLY SEALING CANS.

SPECIFICATION forming part of Letters Patent No. 345,488, dated July 13, 1886.

Application filed January 20, 1886. Serial No. 189,167. (No model.)

*To all whom it may concern:*

Be it known that I, CHYLER B. DAVIS, a citizen of the United States, residing at Chicago, in the county of Cook, State of Illinois, have invented certain new and useful Improvements in Apparatus for Hermetically Sealing Cans, of which the following is a specification, reference being had therein to the accompanying drawings.

This invention has relation to a machine for hermetically sealing cans, the object being to provide an apparatus within which a series of cans may be placed and successively submitted to that portion of the operation of preserving their contents which consists in exhausting the air therefrom and closing the vent usually provided in the cover of the can for that purpose.

The invention consists in certain features of construction hereinafter described, and particularly pointed out in the claims.

Figure 1:
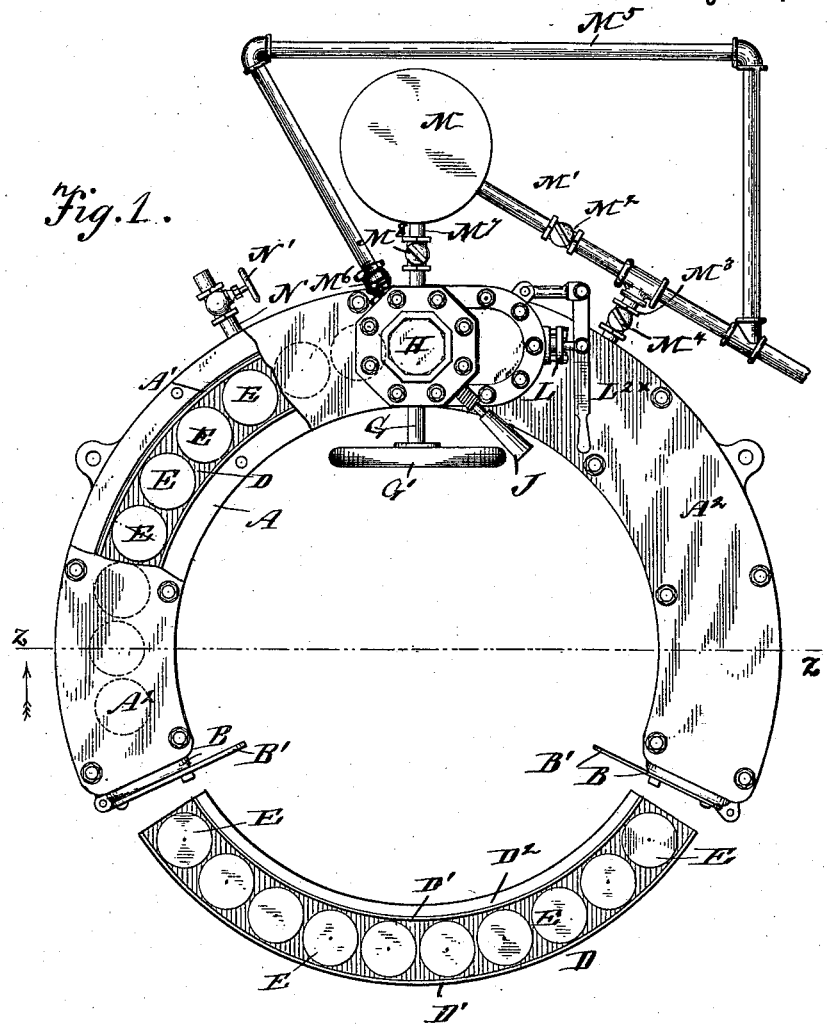
Figure 2:
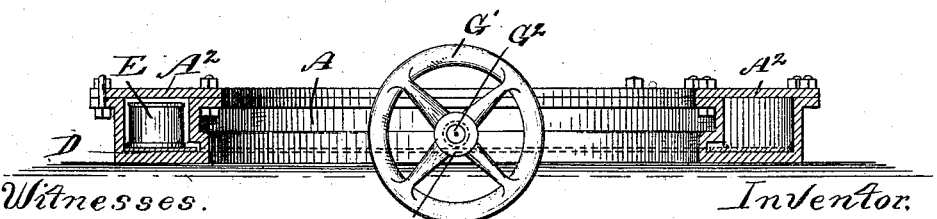
Figure 3:
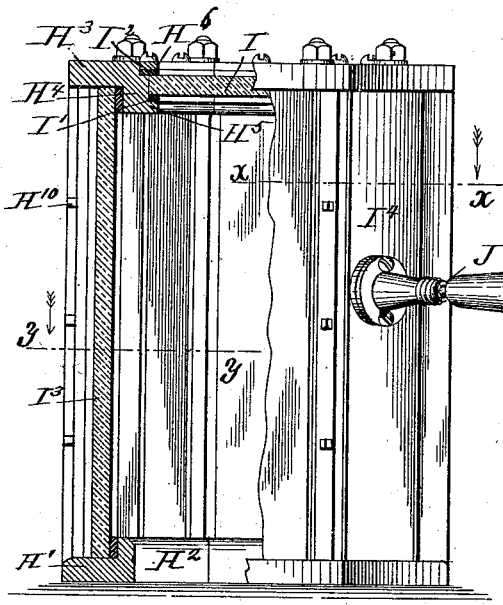
Figure 6:
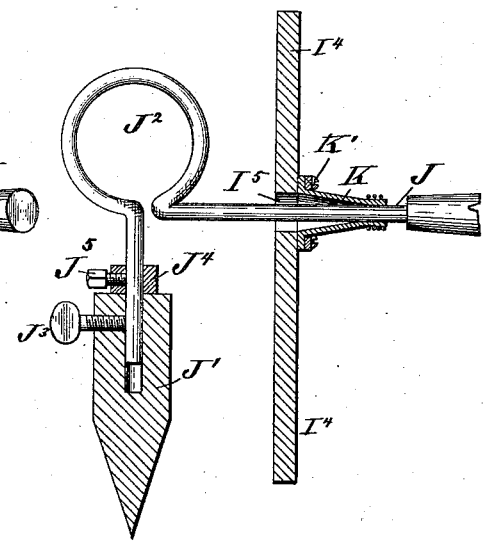
Figure 4:
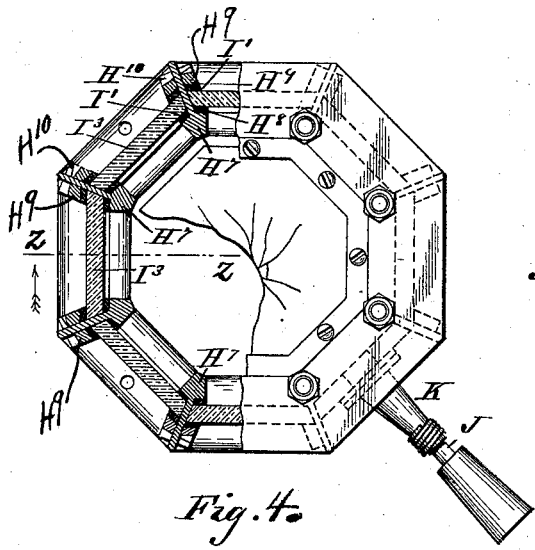
Figure 5:
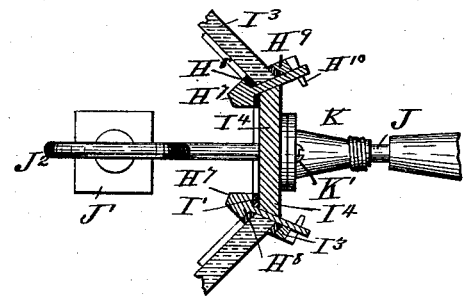
Figure 7:
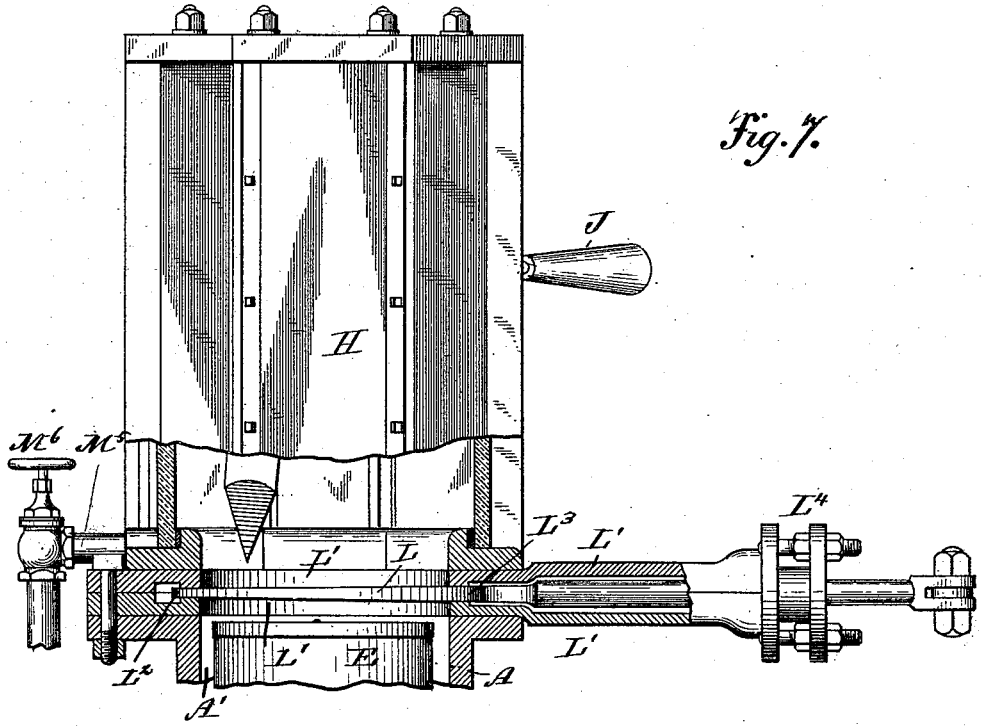
Figure 8:
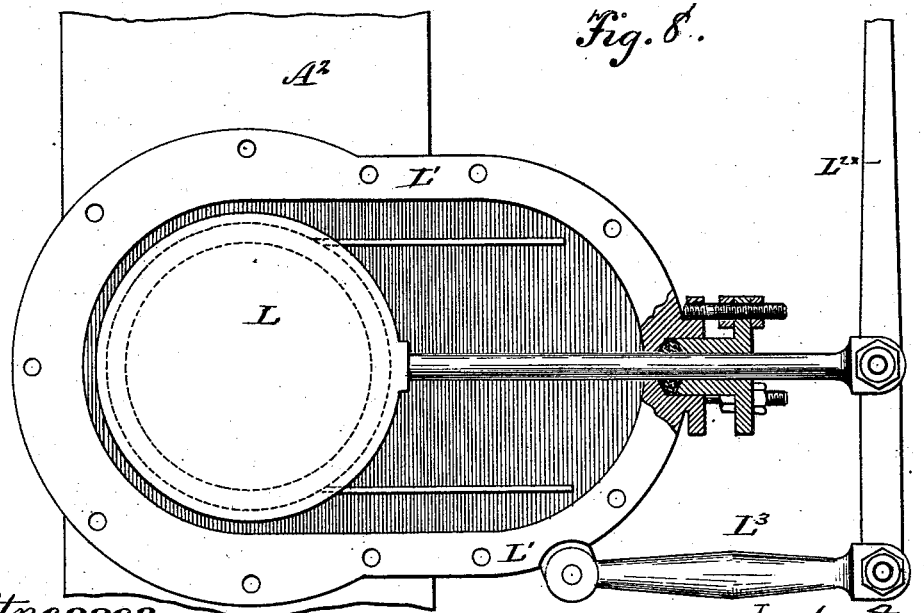

Referring to the drawings, Figure 1 is a plan of a machine constructed in accordance with my invention. Fig. 2 is a vertical section on the line $z$ of Fig. 1. Fig. 3 is a side elevation, partly in section, on the line $z\ z$ of Fig. 4, of the soldering-chamber. Fig. 4 is a plan, partly in section, on the line $y\ y$ of Fig. 3, of the same. Fig. 5 is a detail, in horizontal section, on the line $x\ x$ of Fig. 3, of the same. Fig. 6 is a detail of the soldering implement. Fig. 7 is a side elevation, partly in section, (vertical,) of the soldering-chamber and adjacent parts, including a gate or separator. Fig. 8 is a plan of the gate or separator and its operating mechanism. Fig. 9 shows a modification in the construction of the soldering-chamber. Fig. 10 is a partial horizontal section on the line $y\ y$ of Fig. 9. Fig. 11 is a vertical section of the can-receiving portion of the machine, showing the manner of supporting and operating the can-table. Fig. 12 is a detail showing a modification in mounting the soldering implement.

All sections in the drawings are taken in the directions indicated by the arrows in proximity to the section-lines of the figures.

Like letters indicate like parts in all the figures of the drawings.

A represents the body portion of the machine, which is constructed to form an annular can-receiving portion, A′, and is provided with a cover, A², adapted to inclose said portion. In this instance the general outline of the body of the machine is that of an incomplete circle, and at the opposite ends are provided doors B, closed by means of latches B′, and said doors may be, by any usual packing, adapted for hermetically sealing the ends of the machine when the doors are closed.

D represents the can-table, which is constructed in the form of a segment of a circle, having, if desired, upright flanges D′, for the purpose of maintaining a series of cans, E, in a curved line upon the table, and also having a flange, D², in this instance at the inner edge of the table, which flange is provided for the purpose of moving the table within the body of the machine, and from one end thereof to the other, as hereinafter described.

The several parts of the body of the machine are joined together, in this instance by bolts, so as to render the same, when complete, airtight, in order that the air may be exhausted therefrom.

By reference to Fig. 11 it will be seen that a series of anti-friction rollers, F, may be arranged in grooves or sockets F′, formed in the bottom of the can-receiving portion of the machine, in order that the table D may be supported thereon, instead of resting directly upon the bottom of the machine, as shown in Fig. 2. In either construction a shaft, G, provided with a hand-wheel, G′, is passed through a wall of the machine, and is provided with a friction-disk, G², which bears upon the table D, there being another disk or roller, G³, arranged beneath the table. The anti-friction rollers F and friction-disk G³ are in this instance mounted upon screws or bolts F², crossing slots in which the disks or rollers are arranged. At about the middle of the machine lengthwise is mounted the soldering-chamber H, which in this instance is formed partly of glass and partly of metal. As illustrated in Figs. 3, 4, 5, and 7, the general outline of said chamber is octagonal, there being a base, H′, of metal comprising a horizontal and vertical flange, the latter represented at H². There is also a cap-piece, H³, having a depending flange, H⁴, which is annularly shouldered or recessed, as at H⁵ and H⁶, so that a top plate of glass, I, may be placed upon the shoulder H⁵, suitable packing, I′, being interposed between the plate and said shoulder, and other similar packing being interposed between the upper surface of the plate, and a ring, I², secured by screws or otherwise upon the shoulder H⁶, whereby the plate is secured in the top casting in such a manner as to prevent the air from entering the soldering-chamber. Each of the sides of the chamber consists of a glass plate, I³, except that side through which the soldering-handle is introduced into the chamber, which may be made of metal, wood, or any other suitable material. Suitable packing is inserted between the upper and lower ends of the plates I³ and the vertical flange H² of the base and the depending flange H¹ of the top of the chamber. At the intersection of the two sides there are formed posts H⁷, having recesses or shoulders H⁸, between which and the glass sides I³, suitable packing is arranged, as shown. Outside of the glass sides additional packing is provided, as shown at I', and outside of the packing I' plates or bars H⁹ are arranged and forced against the packing by means of wedges or keys H¹⁰, passing through the thinner or web portion of the posts. By this construction I provide a soldering-chamber which is transparent at all points except at the side wherein the handle J of the soldering implement is introduced within the chamber.

The manner of mounting the implement is substantially the same as shown in my application filed October 16, 1884, and numbered 145,685, and also in a companion application filed herewith. In this instance, however, I construct the handle J of the soldering tool or copper J' of a single piece of metal, which is curved, coiled, or bent, as at J², so as to increase the length thereof, and to diminish the rapidity with which heat may be conducted from the copper through the handle to the wall of the soldering-chamber. The copper is adjustably mounted on the handle by means of a thumb-screw, J³, and the limit of adjustment in one direction may be predetermined by means of a collar, J⁴, and set-screw J⁵, mounted on the handle above the copper. A flexible tube, K, is secured at one end around the handle J, and at the other end, either by means of screws K' or by bolts K², (see Fig. 12,) to the opaque wall I¹ of the chamber, said wall being apertured, as at I⁵, for the passage of the handle of the soldering implement.

In case of a cylindrical soldering-chamber of glass, as shown in Figs. 9 and 10, I provide an opaque section, I⁴, which is secured to the soldering-chamber H—that is, to the glass portion I³ thereof—by a frame, I⁶, secured with suitable packing to the cylinder by bolts I⁷, so as to render the joint between the frame, the opaque panel, and the cylinder air-tight. Between the soldering-chamber and the can-receiving chamber of the machine I interpose a gate or valve, L, and its case L'. The valve proper is in this instance a disk, its front edge, L², being thinner than its rear edge, L³, so that the valve or gate is wedge shape in horizontal section, while the case L' is provided with annular flanges projecting toward each other, between which the valve may be forced by means of a valve-operating lever, L², pivotally connected to the valve-rod and to the link L³, which is pivotally mounted on the case L', whereby a perfectly straight movement of the valve may be produced by the lever. By employing the gate or valve L, I am enabled to cut off the communication of the soldering-chamber from the can-receiving portion of the machine, so that while the air is exhausted from the latter the soldering-chamber may be removed for any purpose whatever without destroying the vacuum already produced in the machine. A stuffing-box, L⁴, renders the connection of the valve-rod with its case air-tight. The means provided in this instance for producing the vacuum or partial vacuum within the machine and its soldering-chamber comprise a separate vessel, M, from which a pipe, M', extends to any suitable pump or other apparatus for exhausting air from the vessel M. A stop-cock, M², is provided in the pipe M, and a branch pipe, M³, extends from the pipe M', so as to communicate with the can-receiving portion of the machine, said branch pipe being provided with a stop-cock or valve, M⁴. Another pipe, M⁵, communicates with the pipe M', and with the soldering-chamber H. A stop-cock, M⁶, (see Fig. 7,) is also provided in this pipe. A pipe, M⁷, communicates with the chamber M and with the can-receiving portion of the machine, and is provided with a stop-cock, M⁸. A pipe, N, with a stop-cock, N', may be arranged, as shown in Fig. 1, to have communication with the can-receiving portion of the machine and with the outer atmosphere.

This being the construction, the operation is as follows: A series of cans, E, are arranged upon the table D, and the table and cans are placed within the can-receiving portion of the machine through one of the doors B. The length of the table is such that when entered with the cans thereon the table extends from the door to nearly beneath the supporting-chamber, as clearly shown in Fig. 1. Now by rotating the hand-wheel G' the table is moved so as to bring the first can of the series within the soldering-chamber. By closing the stop-cocks N' M⁸ M⁶ M⁴ and opening the stop-cock M² of the pipe M' it will be seen that the air will be exhausted from the chamber M and a vacuum produced therein, when the stop-cock M² may be closed. The chamber M may be of any desired capacity, in order that the air may be exhausted from the can-receiving portion of the machine, and also from the soldering-chamber, provided the gate L be open. After the air is thus exhausted each of the cans upon the table is successively brought under the soldering implement, and the drop of solder is melted thereby, so as to close the vent in the cover of the can, the glass walls of the soldering-chamber permitting a clear inspection of the work being performed. When all the cans upon the table have been sealed, the stop-cock N' may be opened to allow the entrance of the external atmosphere, in order to relieve the pressure upon the doors at the end of the machine, so that the same may be more easily opened and the table and cans removed and another table and cans inserted for a repetition of the operation. Now, in case it becomes necessary to remove the soldering-tool, the same can be done during the process of sealing a series of cans by closing the gate L, to prevent the vacuum produced in the machine being destroyed, and when the soldering chamber and tool are replaced a vacuum may be produced in the soldering-chamber alone by opening the stop-cock M⁶, thereby opening communication directly with the pump. In case the vacuum primarily produced in the chamber M becomes reduced by successive charges of air received from the machine, or when it is desired for other purposes to increase the perfection of the vacuum produced in the machine, the stop-cock M⁴ may be opened while the others remain closed, and the desired result produced by the direct communication thus established with the pump or other vacuum-producing mechanism.

Certain features of construction herein shown are not claimed, as they are shown and described in the companion applications hereinbefore referred to.

It will be noticed that when the cocks N', M⁶, M⁸, and M⁴ are closed and the cock M² open, and the pump or other vacuum-producing device in operation, a high degree of vacuum is maintained in the chamber M. By opening cock M⁸ equilibrium of the vacuum will be secured in the chamber M and in the can-receiving chamber of the machine. So, also, by closing the cocks M², M⁸, M⁶, and N' and opening the cock M⁴ the vacuum-pump may be worked directly upon the can-receiving chamber of the machine. Then by closing M⁴ and opening M⁶, after the soldering-chamber has been placed in position, the air will be exhausted therefrom by direct action of the pump through the connecting-pipe M⁵.

It will be seen from the above that a high degree of vacuum can be secured in the can-receiving chamber before the soldering-tool and chamber are placed in position, otherwise when opening the gate L the soldering tool or implement will cool before a sufficient degree of exhaustion is established in the can-receiving chamber.

The side I' of the soldering-chamber through which the handle of the soldering implement passes is removable, in order to permit of the removal of the soldering implement for heating the same.

By referring to Figs. 9, 10, and 12 it will be noticed that the side of the panel I⁴ is provided with a beveled shoulder, I⁹, which is adapted to fit tightly in the panel I⁸, any suitable packing, I⁷, being employed, if desired.

A modification of the arrangement of the packing and seating of the panel I I⁴ thereon is illustrated in Fig. 10.

Certain features of construction herein shown and described are not claimed, as they form subjects-matter of two other applications of mine—viz., Nos. 145,685 and 189,166.

Having thus fully described my invention and its operation, what I claim is—

1. A machine for hermetically sealing cans, which comprises a body portion having the form of a segment of an annulus, doors for closing the ends of the same, and means, substantially as shown and described, for exhausting the air from the body portion of the machine, substantially as and for the purpose specified.

2. In a machine for hermetically sealing cans, a body portion constructed in the form of a segment of an annulus, a can-table constructed in a like form, and mechanism for moving the table within the body portion of the machine, substantially as specified.

3. In a machine for hermetically sealing cans, a body portion having the form of a segment of an annulus, a can-table having a similar form, and an unobstructed flange and a shaft extending through a wall of the body portion and provided at one end with a friction-disk adapted to bear upon the unobstructed flange of the segmental table for the purpose of moving the same within the body portion of the machine, substantially as specified.

4. A machine for hermetically sealing cans, comprising a body portion having the form of a segment of an annulus and provided with a door at each end thereof, a table having a similar form, and a soldering-chamber mounted about mid-length the body and communicating with the interior thereof, substantially as specified.

5. In a machine for hermetically sealing cans, a body or can-receiving portion, a soldering-chamber, and an interposed cut-off, substantially as specified.

6. In a machine for hermetically sealing cans, a body portion for receiving cans, a soldering-chamber mounted thereon, an interposed cut-off or gate, and separate pipe-connections extending from the body of the machine and from the soldering-chamber, and having communication with an exhaust-producing device, substantially as specified.

7. In a machine for hermetically sealing cans, a body portion for receiving the cans, an exhaust-producing chamber connected with the body portion and with a pump or other exhaust-producing mechanism, and a branch connection arranged between the pump and the exhaust-chamber and communicating with the body of the machine, the connections between the body of the machine and the exhaust chamber and pump each being provided with stop-cocks, whereby the direct action of the exhaust-pump may be utilized in either the exhaust-chamber or within the body portion of the machine, as desired, substantially as specified.

8. In a machine for hermetically sealing cans, a can-receiving chamber, a soldering-chamber, an interposed cut-off or gate, a separate exhaust-chamber, and a system of pipes having stop-cocks, whereby direct action of the exhaust-pump or other exhaust-producing mechanism may be utilized in either of the three principal elements enumerated, substantially as specified.

9. In a soldering-chamber, the combination of transparent walls, an opaque wall apertured for the passage of the handle of the soldering implement, a soldering implement, and means, substantially as shown and described, for hermetically joining said implement and opaque wall and the said transparent walls with each other to form a complete structure, substantially as specified.

10. In a soldering-chamber, in a machine for hermetically sealing cans, the combination of a metallic base, cap-piece, and posts, an opaque panel, the soldering-tool J, and transparent panels hermetically united with the posts, cap, and base, substantially as specified.

11. The combination of the post $H^7$, having shoulders $H^8$, panel $I^3$, packing $I'$, plates or bars $H^9$, and wedges $H^{10}$, substantially as shown and described.

12. The cut off gate L, in combination with its case $L'$, and with the body A of the machine, and the base of the soldering-chamber H, the whole being constructed and arranged substantially as specified.

13. The combination, with the body A, of the gate L, its case $L'$, the soldering-chamber H, the rod $L^2$, and link $L^3$, substantially as shown and described.

In testimony whereof I affix my signature in presence of two witnesses.

CHYLER B. DAVIS.

Witnesses:
CARL R. SHERWOOD,
HENRY BOOTH.